(12) United States Patent (10) Patent No.: US 7,774,239 B2
Prescott (45) Date of Patent: Aug. 10, 2010

(54) AUTOMATED ON-LINE PURCHASING SYSTEM

(75) Inventor: James Prescott, 7748 Stoneford Dr., Columbus, OH (US) 43235

(73) Assignee: James Prescott, Columbus, OH (US)

( * ) Notice: Subject to any disclaimer, the term of this patent is extended or adjusted under 35 U.S.C. 154(b) by 863 days.

(21) Appl. No.: 11/548,115

(22) Filed: Oct. 10, 2006

(65) Prior Publication Data
US 2007/0130022 A1    Jun. 7, 2007

Related U.S. Application Data

(63) Continuation of application No. 10/646,676, filed on Aug. 22, 2003, now abandoned.

(60) Provisional application No. 60/405,527, filed on Aug. 23, 2002.

(51) Int. Cl.
*G06Q 30/00* (2006.01)
(52) U.S. Cl. .................................................... 705/26
(58) Field of Classification Search ................ 705/26, 705/27
See application file for complete search history.

(56) References Cited

U.S. PATENT DOCUMENTS

| | | | |
|---|---|---|---|
| 5,960,411 A | 9/1999 | Hartman et al. | |
| 6,125,352 A | 9/2000 | Franklin et al. | |
| 6,233,565 B1 | 5/2001 | Lewis et al. | |
| 6,304,850 B1 | 10/2001 | Keller et al. | |
| 6,466,918 B1 * | 10/2002 | Spiegel et al. | 705/27 |
| 6,496,809 B1 * | 12/2002 | Nakfoor | 705/80 |
| 6,625,581 B1 * | 9/2003 | Perkowski | 705/27 |

(Continued)

FOREIGN PATENT DOCUMENTS

WO    0075838    12/2000

OTHER PUBLICATIONS

"E-commerce, technology efforts propelled Ticketmaster's year", Amusement Business, Dec. 24, 2001, Proquest # 97934414, 4 pages.*

*Primary Examiner*—Jason Dunham
(74) *Attorney, Agent, or Firm*—McNees Wallace & Nurick

(57) ABSTRACT

An Internet-based purchasing system and associated method, including: (i) a remote terminal for use by a consumer; (ii) an on-line purchasing system, wherein the system further includes a system database in communication with the remote terminal for storing both consumer information and ticket and merchandise information; (iii) a user interface between the remote terminal and the on-line purchasing system for allowing the exchange of information and commands between the remote terminal and the on-line purchasing system; (iv) at least one source system in communication with the on-line purchasing system for allowing vendors of tickets or merchandise to sell items on-line, wherein the source system further includes a source database for storing current ticket and merchandise information; (v) a communication interface between the on-line purchasing system and the source system for allowing data exchange between the systems; (vi) software means for allowing the on-line purchasing system to monitor the source system for current ticket or merchandise information and communicate the information back to the on-line purchasing system; (vii) software means for allowing the on-line purchasing system to execute the purchase of tickets or merchandise from the source system based on the current information; and (viii) software means for allowing the source system to communicate with the remote terminal to indicate the completion of the purchase to the consumer.

4 Claims, 7 Drawing Sheets

U.S. PATENT DOCUMENTS

| | | | |
|---|---|---|---|
| 6,850,901 B1 * | 2/2005 | Hunter et al. | 705/26 |
| 6,907,405 B2 * | 6/2005 | Brett | 705/37 |
| 7,031,945 B1 * | 4/2006 | Donner | 705/64 |
| 7,206,755 B1 * | 4/2007 | Muralidhar | 705/26 |
| 2002/0010640 A1 | 1/2002 | Dutta et al. | |
| 2002/0029169 A1 | 3/2002 | Oki et al. | |
| 2002/0184103 A1 * | 12/2002 | Shah et al. | 705/26 |
| 2003/0126095 A1 * | 7/2003 | Allen | 705/80 |
| 2003/0236729 A1 * | 12/2003 | Epstein et al. | 705/36 |

\* cited by examiner

AUTOMATED ON-LINE PURCHASING SYSTEM

CROSS-REFERENCE TO RELATED APPLICATIONS

This application is a continuation of U.S. Utility application Ser. No. 10/646,676, filed on Aug. 22, 2003 and entitled "Automated On-Line Purchasing System", which claims the benefit of U.S. Provisional Patent Application Ser. No. 60/405,527, which was filed on Aug. 23, 2002 and entitled "Automated Ticket Retrieval," the disclosures of which are incorporated as if fully rewritten herein.

TECHNICAL FIELD OF THE INVENTION

The present invention relates in general to an Internet-based system for conducting consumer or commercial transactions, and more specifically to an automated Internet or web-based system for locating and purchasing tickets to sporting events, concerts, or other events and/or merchandise.

BACKGROUND OF THE INVENTION

Purchasing tickets for sporting events, concerts, or other events frequently requires driving to a location where tickets are sold and standing line with the hope of being able to obtain both the desired number of tickets and decent seats. While many venues and ticket sales companies, as well as many merchants, have implemented on-line purchasing systems in recent years, purchasing tickets or other merchandise for which there are limited quantities still involves waiting, in real time, for the right moment to make the purchase. The ability of the average consumer to utilize the Internet for a variety of transactions creates the potential for a web-based system that could be used to prioritize customer orders such that the waiting involved is reduced or eliminated. Thus, there is a need for an on-line, Internet or web-based system that allows a consumer to make a purchase without the inconvenience of constantly monitoring a vendor's website for the moment when an item becomes available for purchase.

SUMMARY OF THE INVENTION

These and other deficiencies of the prior art are overcome by the present invention, the exemplary embodiment of which provides an Internet-based system for purchasing items on-line. This invention permits the consumer of tickets and other merchandise to use a web page to enter their customer information, including credit card information, and the items they wish to purchase. This system will then monitor the information found at various vendor web sites and complete the desired transaction at the moment the merchandise becomes available, thereby eliminating the need for the consumer to stand in line or constantly monitor the vendor web sites waiting for the right moment to make the desired purchase.

The exemplary embodiment of this invention includes: (i) a remote terminal for use by a consumer; (ii) an on-line purchasing system, wherein the system further includes a system database in communication with the remote terminal for storing both consumer information and ticket and merchandise information; (iii) a user interface between the remote terminal and the on-line purchasing system for allowing the exchange of information and commands between the remote terminal and the on-line purchasing system; (iv) at least one source system in communication with the on-line purchasing system for allowing vendors of tickets or merchandise to sell items on-line, wherein the source system further includes a source database for storing current ticket and merchandise information; (v) a communication interface between the on-line purchasing system and the source system for allowing data exchange between the systems; (vi) software means for allowing the on-line purchasing system to monitor the source system for current ticket or merchandise information and communicate the information back to the on-line purchasing system; (vii) software means for allowing the on-line purchasing system to execute the purchase of tickets or merchandise from the source system based on the current information; and (viii) software means for allowing the source system to communicate with the remote terminal to indicate the completion of the purchase to the consumer.

Further advantages of the present invention will become apparent to those of ordinary skill in the art upon reading and understanding the following detailed description of the preferred embodiments.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the preferred embodiments given below, serve to explain the principles of the invention.

DETAILED DESCRIPTION OF THE INVENTION

Figure 1:
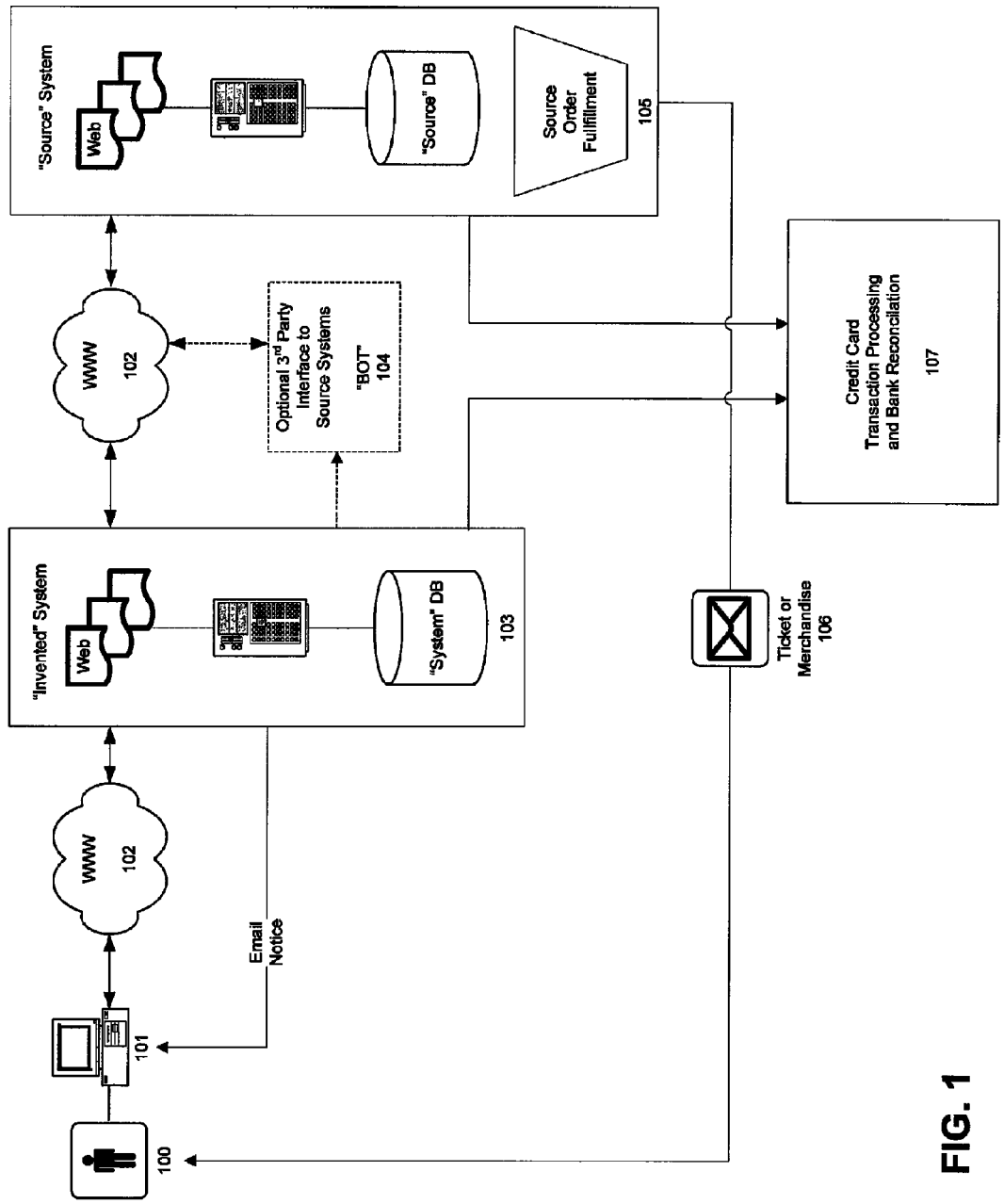
FIG. 1 is a flow chart illustrating the system topology and associated external systems utilized by the present invention.

The present invention provides an Internet based system and method for purchasing tickets or merchandise based on customer pre-registration and prioritization. With reference to the Figures, FIG. 1 illustrates, in graphic form, an exemplary embodiment of the system topology and the associated external systems. FIG. 1 discloses the system and methods for pre-registering transactional and contact information. This information lies dormant while the Invented System 103 monitors for and ultimately purchases an on-line product, on-line tickets to an event or movie, or registers the customer 100 for an on-line course registration on behalf of the customer 100, at the moment that the product or event posts for public sale. The automated software that carries out this function is referred to herein as a 'BOT' 104.

As shown in FIG. 1, a customer 100, with a computer 101, that has access to the Internet 102, can access the Invented System 103, which comprises a client interface, a server, and one or more source or vendor databases. System 103, at pre-defined intervals, will seek and extract database information from various Source Systems 105. Once the customer or end-user of system 103, has registered for an event or to purchase a product by means of the Invented System 103, the relevant information is stored within the system until the event is posted for public sale on the Source System 105. When the relevant information is posted on the Source System, BOT 104 automatically executes the transaction through the Source System 105.

Upon Source Order Fulfillment within the Source System 105, an automated email notification 106, is sent to the customer 100. This notification includes a message indicating that the Invented System 103, has made the desired purchase and that the customer will, or should be, be receiving an email from the Source System regarding the completed transaction. This notification may also include a disclaimer indicating that the Invented System 103 has completed its intended function and from this point forward, the relationship and any binding purchase agreement is between the customer 100, and the Source System 105, and should any problems arise, the Source System 105 should be contacted for assistance.

Upon successful execution of the Source Order Fulfillment within the Source System 105, the customer 100, will be charged a monetary fee by Invented System 103. The fee aspect of the transaction will be processed by a Credit Card Institution 107 using the same credit card information used for the actual purchase through Source System 105. In the exemplary embodiment, the fee is not charged to the customer if the transaction does not actually occur.

Figure 2:
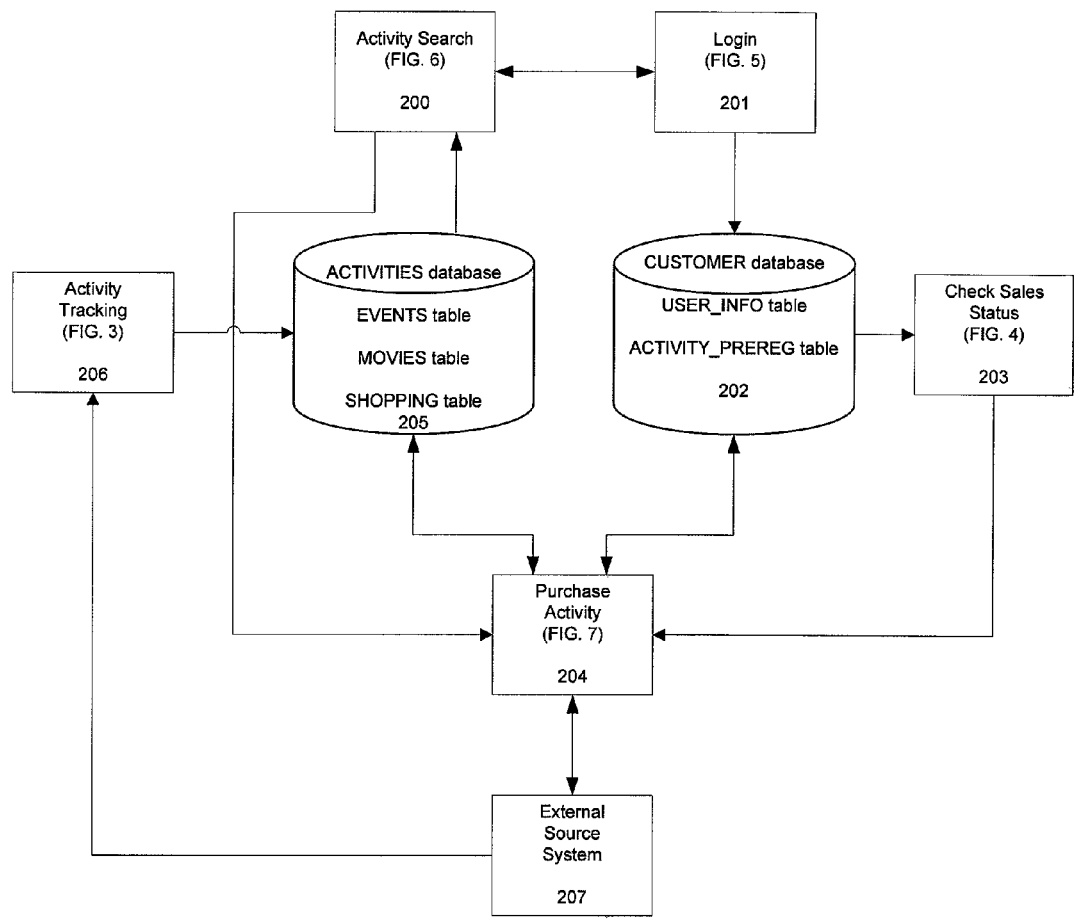
FIG. 2 is a diagram illustrating the relationships between the various entities to the transactions enabled by the present invention.

FIG. 2 illustrates the relationships between the various entities to the transactions enabled by the present invention. Upon accessing System 103, the customer 100 has the option to either perform an Activity Search 200 or Login 201. The customer wishing to immediately begin an Activity Search 200 will have access to information stored within the Activities Database 205, which includes, in the exemplary embodiment, categories such as Events, Movies Shopping, Course Registration or any other items for sale that are offered to the public, on-line, on a 'first come, first served' basis. This Activities Database 205 gathers its information by means of an Activity Tracking software module that is executed at various pre-defined intervals and extracts information from the External Source System 207, also referred to as the Source System 105.

If the customer expresses interest in a particular event or product offered by the Invented System 103, the customer is transferred to the Login 201 screen. Upon successful Login, the customer's basic information, e.g. contact, user and financial, is stored in the secured Customer Database 202. Once the customer pre-registers for an event or product, the event information and purchasing status is also available for viewing by the customer as this data is also stored within the secured Customer Database 202.

Figure 4:
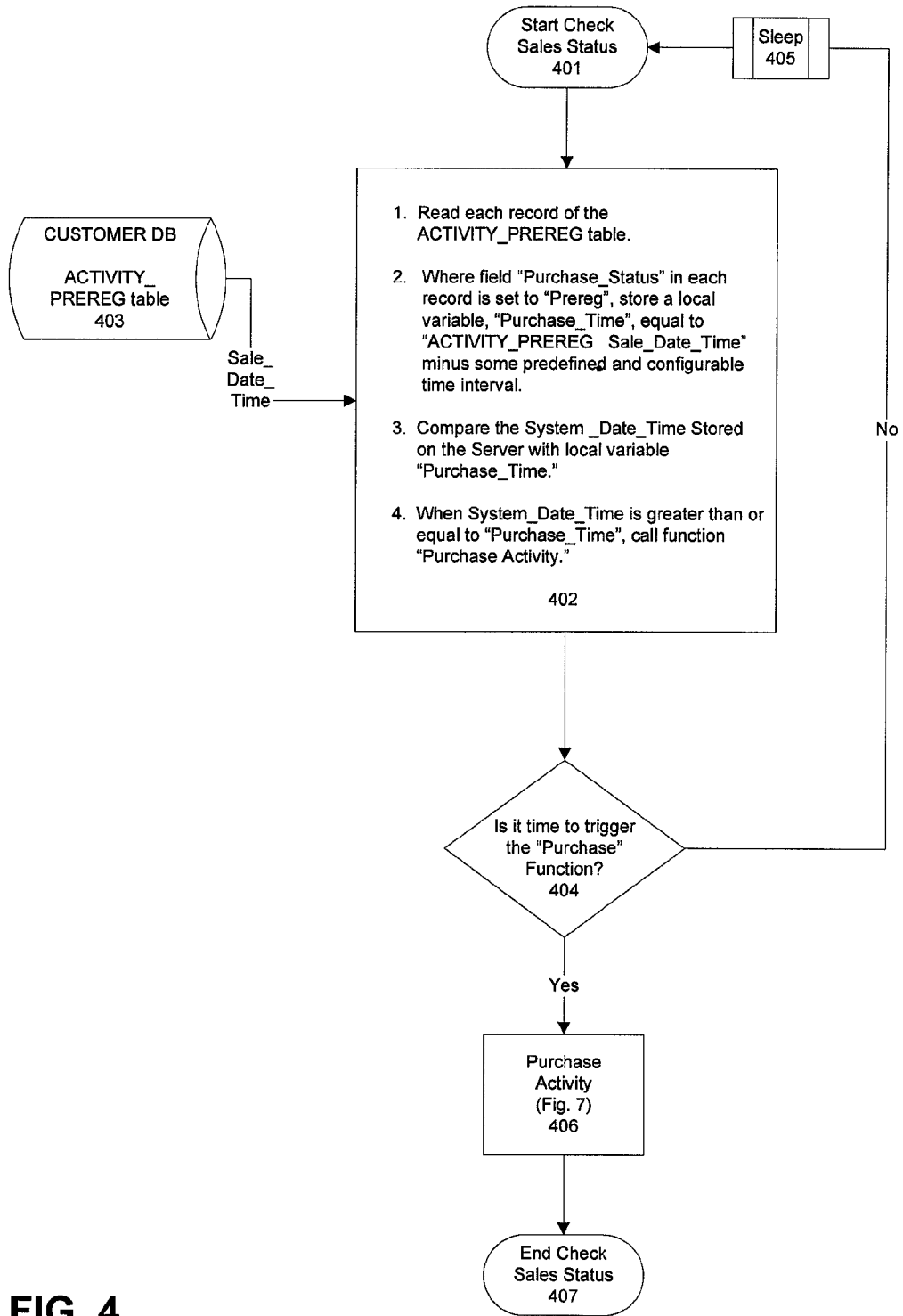
FIG. 4 is a flow chart illustrating the "check sales status" function of the system and method of the present invention.

Another automated software module, which is executed in intervals, is the Check Sales Status 203 (see FIG. 4). This software module, when executed, scans the Customer Database 202 for all pending Customer Purchases with a 'PRE-REG' status while also doing a time check with the listed scheduled date and time in which the product of event will be posted for public sale. If it is time to make the purchase, the information is then transferred to the Purchase Activity 204 where the transaction is then executed, on behalf of the customer, with the External Source System 207.

Figure 3:
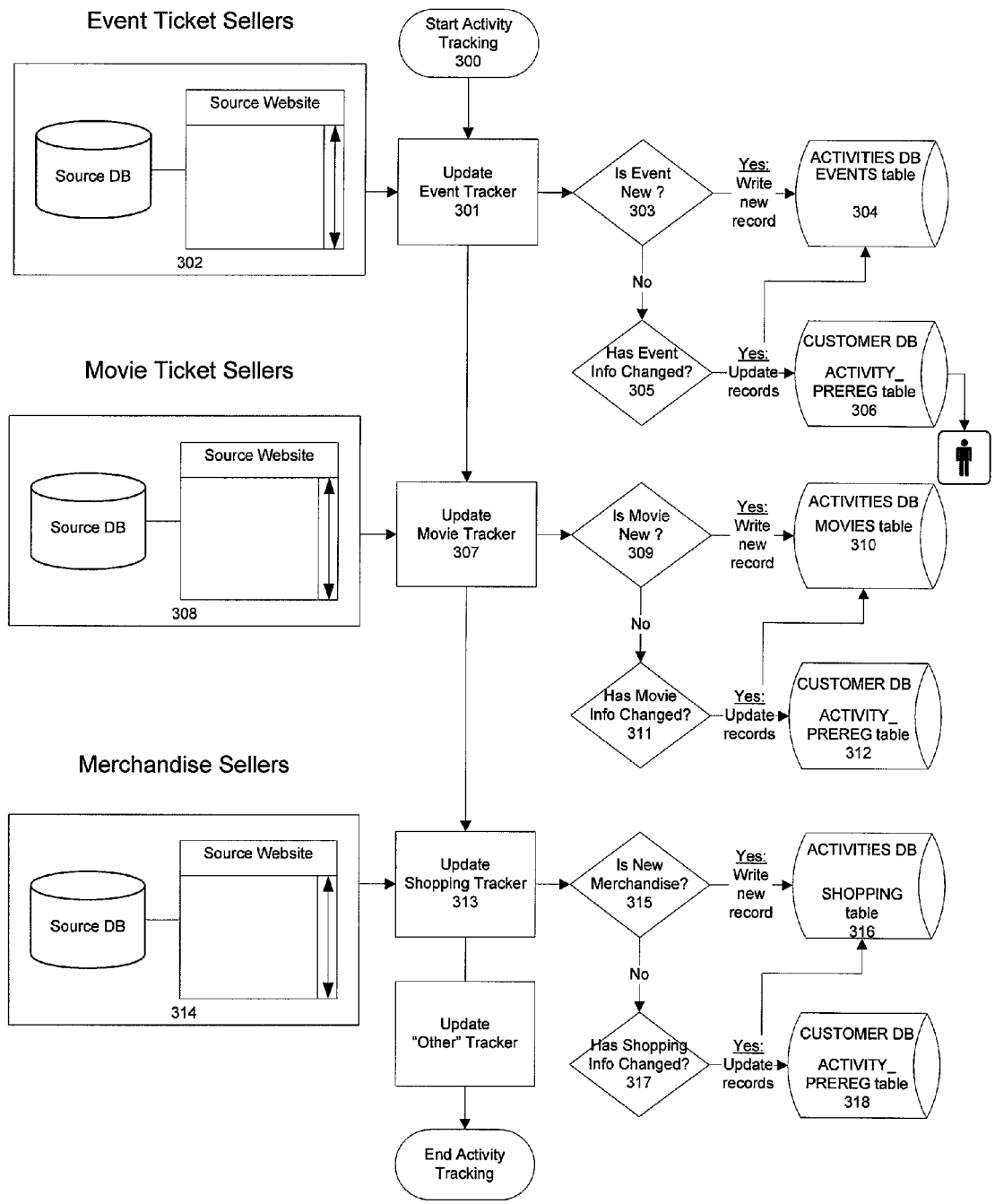
FIG. 3 is a flow chart illustrating the "activity tracking" component of the system and method of the present invention.

As shown in FIG. 3, the activity tracking feature of the present invention is embedded within System 103. At a predetermined interval, Start Activity Tracking module 300, will execute. When this feature engages, it performs a comparison/deviation check between the Source System 105 database information, and previously extracted information stored and offered within the System 103 database.

For the Event Ticket Source System 301, the Start Activity Tracking module 300, will send a request to the Event Ticket Sellers Source Web site 302 and gather information about every event offered. For each event, Start Activity Tracking module 300 will execute the "Is The Event New?" query 303. If the answer is in the affirmative, the system will store the event information on the Activities Database and Events Table 304 within System 103. The "Has Event Information Changed?" 305 query determines whether previously stored information has changed. If so, the system will over-write previously stored information and any customers that had pre-registered for an event where relevant information has been added, updated or changed, will receive and update to their Invented System Customer Database/Activity Pre-Reg Table 306 to reflect the changed information. An automatically generated email will be sent describing the change that has occurred.

Once the Start Activity Tracking module 300 completes its scan of the Event Ticket Sellers Source Web Site 302, it will proceed to check the remaining categories with their relative Source System Web Sites, e.g. Movie Tickets 308, Merchandise Sellers 314, Course Registrations or other such applicable Source Systems.

As shown in FIG. 4, the Start Check Sales Status 401 module is an automated feature within System 103. At a pre-defined interval, this feature is executed. Upon execution, the module accesses the Customer Database Activity PRE-REG Table 403. The Start Check Sales Status module 401 seeks two specific fields 402 (i) where the Purchase Status is set to 'PREREG,' meaning the customer 100 has entered all required transactional information necessary for the Invented System to complete the transaction with the Source System 105 on behalf of the customer, and (ii) Purchase Time, meaning the date and time that the event is slated to be posted for public sale on the Source System 105. A formula is generated in order to execute the purchase at some time variable, just prior to the projected public sale posting to ensure that the transaction takes place the moment that the event or product is offered (in case the Source System 105 releases the access to the product or event a bit earlier than made aware to the public).

When the Start Check Sales Status 401 module retrieves this information, it checks the System Date and Time stored within the Customer Database Activity PREREG Table, against the server with local variable Purchase Time 402. The decision to purchase occurs at "Is It Time to Trigger the Purchase Function?" 404; if not, this automation feature will go to sleep 405, until it is time for the next interval to execute. If it is time to purchase the stored event or product, the information is then processed through the Purchase Activity (see FIG. 7) 406, then End Check Sales Status 407.

Figure 5:
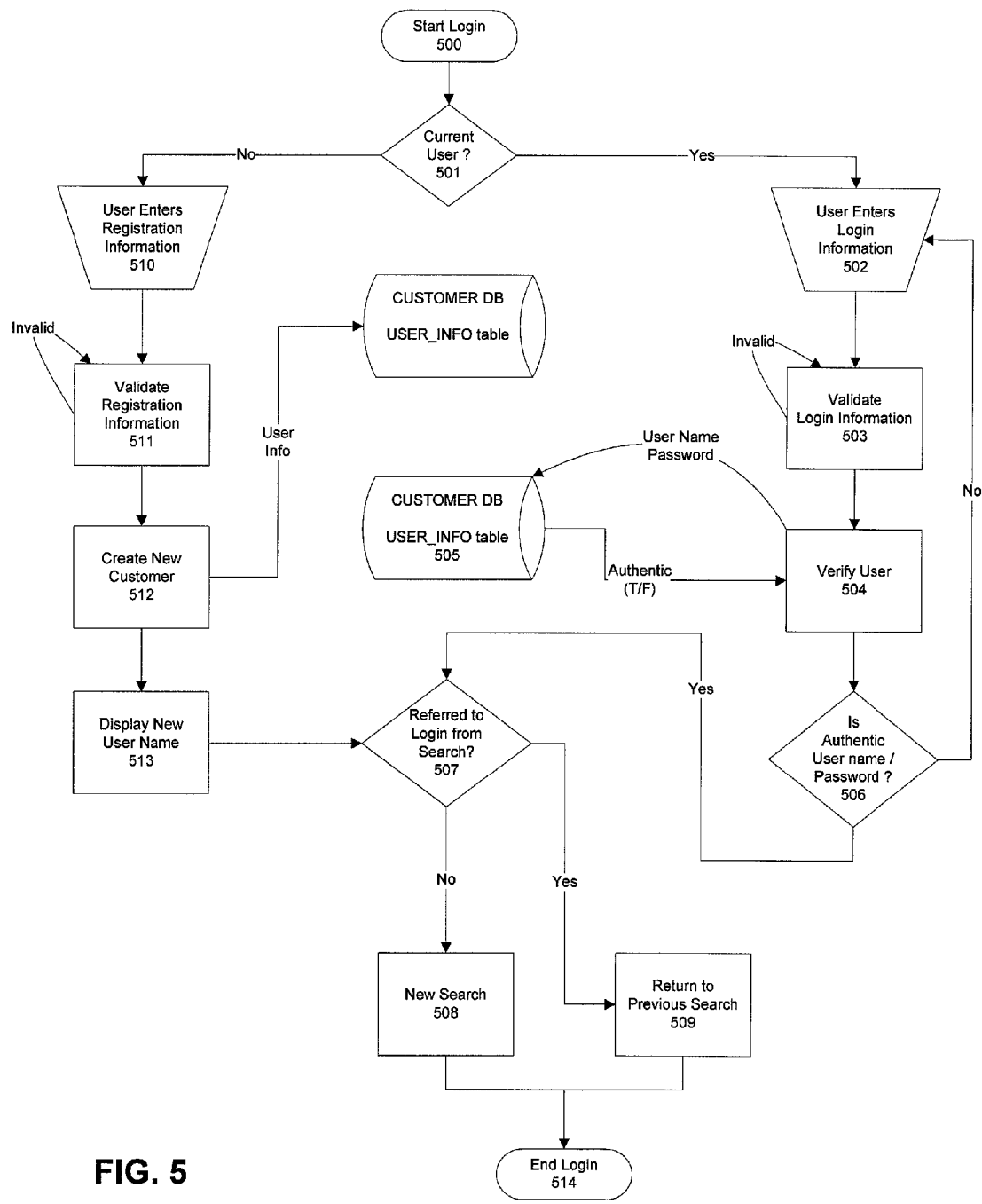
FIG. 5 is a flow chart illustrating the process of "logging in" to the system and method of the present invention.

With reference to FIG. 5, once the user elects to Login 500, they are taken through a series of prompts. The first prompt is, "Are You A Current Registered User?" 501. If the answer is yes, the user Enters Login Information 502. Once the user Information is entered, System 103 will validate the information 503 and will then Verify User 504 by checking entered information against previously entered information within the Customer Database User Information Table 505. The next prompt is "Is Authentic User Name/Password?" 506. If no, the user is re-directed to "User Enters Login Information" 502. If yes, the next prompt is "Was the User Referred to Login from a Search?" 507. If yes, the user will be "Returned to Previous Search" 509. If no, the user will be taken to the "New Search" 508 page of System 103.

If the user is not a Current Registered User, the User Enters Registration Information 510. System 103 will then validate Registration Information 511, then create the New Customer 512 record and will store user Information within the Customer Database User Information Table 515. System 103 will then Display New User Name 513 and will then carry user over to the previously mentioned "Referred to Login from Search?" 507 following the same process chain from there as previously described.

Figure 6:
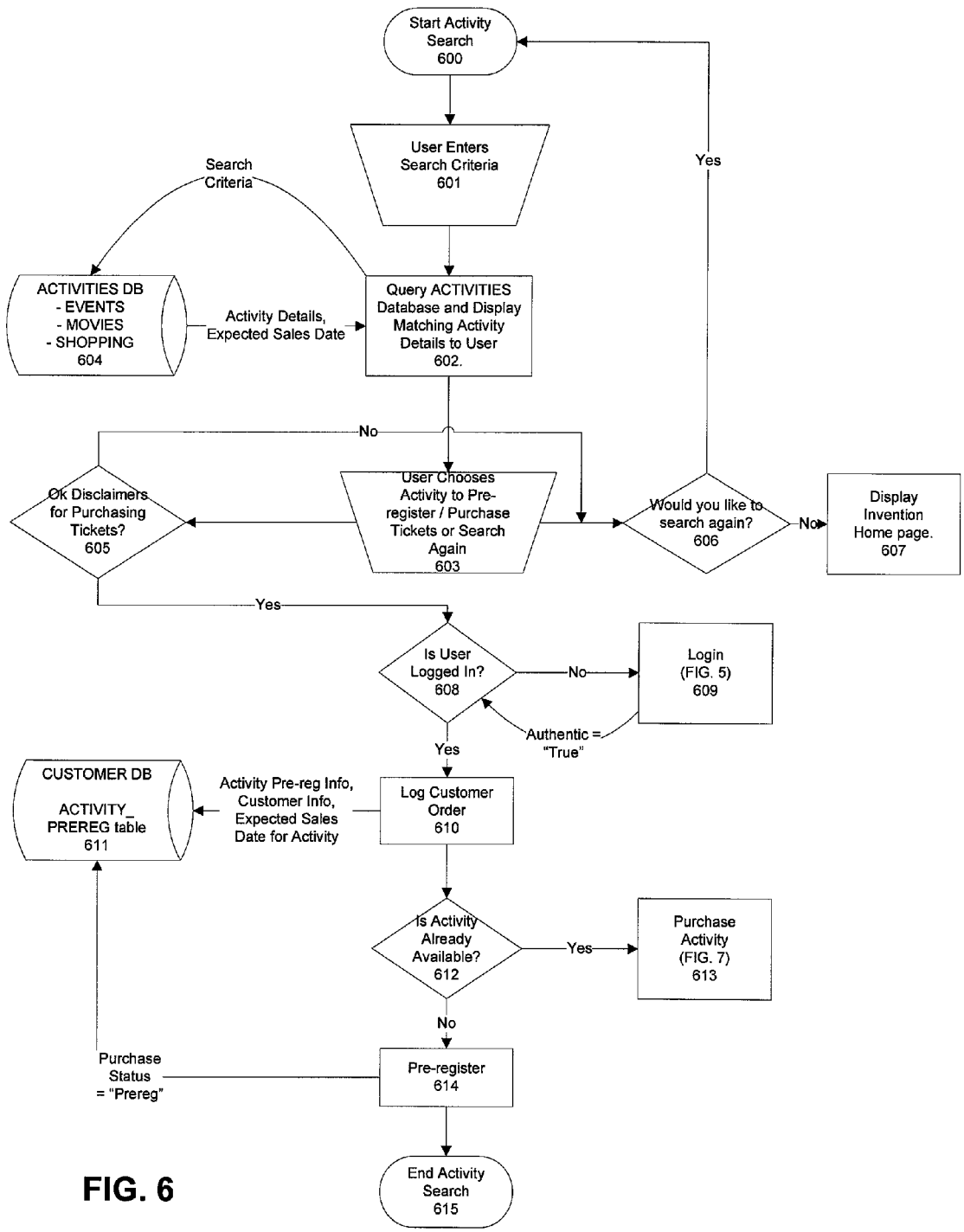
FIG. 6 is a flowchart illustrating the "activity search" function of the system and method of the present invention.

The Activity Search function disclosed in FIG. 6 illustrates how a customer 100, or potential customer, can maneuver through the System 103 Web Site. The user begins by executing the Start Activity Tracking 600 feature which takes the user to a series of required fields of input. The "User Enters Search Criteria" 601, which "Queries Activities Database" 604 and returns and displays matching activity "Details to the User" 602. The user then chooses "Activity To Pre-Register, Purchase Tickets, or Search Again" 603.

If the user selects to pre-register or purchase they are sent to the Disclaimers for Purchasing Tickets 605. Upon review and acceptance of the Disclaimers For Purchasing Tickets 605, the user is asked if they are logged in? 608. If not, they are sent to the Login Screen (see FIG. 5) 609. Once the user validates and logs in they are re-directed to the Log Customer Order 610 section within the Invented System 103. Upon execution of the function, the Activity Pre-Reg. information, Customer Information, and Expected Sales Date for Activity are stored within the Customer Database Activity Pre-Reg Table 611 (i.e., purchase status is entered as 'PREREG'). In the event that the described event is already posted for public sale, and the customer wishes to continue with a purchase, they are directly transferred to the Purchase Activity page 613. If the user chooses to search again 606 they are re-directed to Start Activity Search 600. If the user decides not to perform another search, then they are directed to System Home Page 607.

Figure 7:
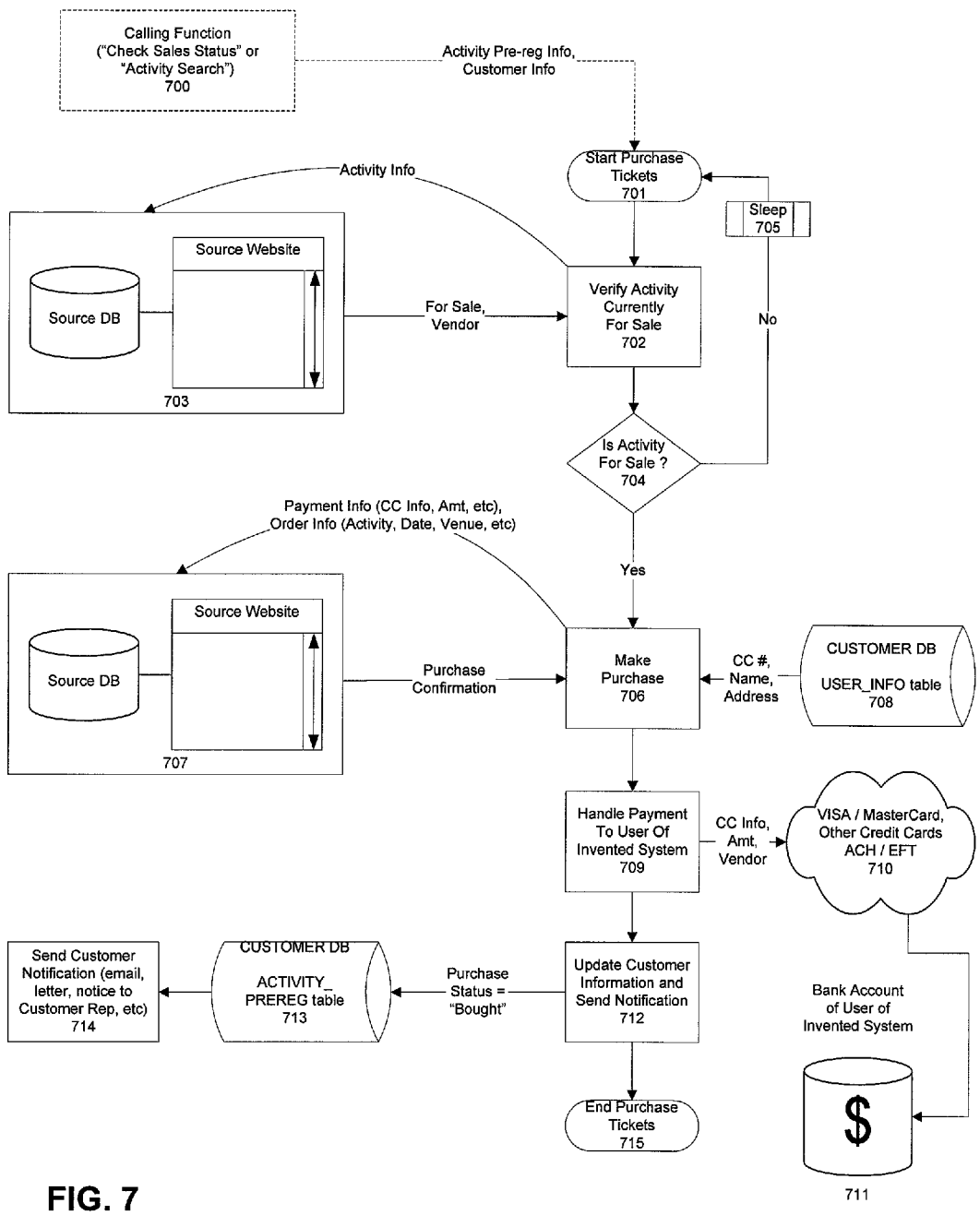
FIG. 7 is a flowchart illustrating the "activity purchase" aspect of the system and method of the present invention.

With reference to FIG. 7, if called for by the Check Sales Status (see FIG. 4) or by the Activity Search (see FIG. 6) 700, the transactional information is carried forward to Start Purchase Tickets 701. System 103 verifies "Activity Currently For Sale" 702 by accessing the Activity Information within the Source System Database and Website 703 to verify that the product or event is actually posted for public sale at "Is Activity For Sale?" 704. If not, the function will sleep 705 for a specified interval before re-attempting execution of the Purchase Activity command. If yes, the system will proceed to Make Purchase 706, where System 103 will extract transactional information from Customer Database User Information Table 708 and execute the necessary commands within the Payment Information area of the Source System 707. Upon completion and confirmation of the Purchase on behalf of the customer, System 103 will "Handle Payment of User Of Invented System" 709, by applying specified and previously agreed upon charges to the same credit card used to make the event or product purchase. This information is then sent to the proper Credit Card Processing Institution 710, where the money would then be issued to the Bank Account of the System 711.

Following the steps enumerated above, System 103 then "Updates Customer Information and Send Notification" 712, changes Purchase Status to 'BOUGHT' within the Customer Database Activity PREREG Table 713, and "Sends Customer Notification" (email, letter, notice to Customer Rep, etc.) 714. If, for some reason, the attempt to purchase the event or product for the user fails, an automatically generated email will be sent to the user with possible explanations for errors and an error history will also be stored within the Invented System for tracking, statistical, or action purposes. The process terminates at "End Purchase Tickets" 715.

While the above description contains many specificities, these should not be construed as limitations on the scope of the invention, but rather as exemplification of certain preferred embodiments. Numerous other variations of the present invention are possible, and is not intended herein to mention all of the possible equivalent forms or ramifications of this invention. Various changes may be made to the present invention without departing from the scope or spirit of the invention.

What is claimed:

1. An on-line system for executing transactions, comprising:
  (a) a remote terminal, wherein the remote terminal is used by a customer to enter customer information, customer event and merchandise preferences, and customer pre-registration choices of desired events or merchandise, and wherein the remote terminal further includes Internet access;
  (b) an on-line transaction system, wherein the on-line transaction system further includes: a server and a system database located on the server, wherein the system database is in communication with the remote terminal and stores customer information, customer event and merchandise preferences, and customer pre-registration choices;
  (c) at least one source system in communication with the on-line system for allowing vendors to sell on-line, wherein the source system further comprises a source database for storing current vendor event and merchandise information;
  (d) a communications interface between the on-line transaction system and the source system for allowing information exchange between the two systems;
  (e) a software program located on the server for allowing the customer to pre-register with the on-line transaction system by entering personal contact information, payment information, customer event and merchandise preferences, and customer pre-registration choices of desired events or merchandise becoming available on-line in the source database, wherein the software program prioritizes the customer pre-registration choices of desired events or merchandise becoming available on-line relative to other customers using the on-line system based on time of the customer pre-registration;
  (f) an activity tracking software module located on the server for allowing the on-line transaction system to automatically monitor the source system for current event and merchandise information and communicate the information back to the on-line transaction system;
  (g) a check sales status module, programmed to run at predefined intervals to determine if customer pre-registration choice is available on the at least one source system, wherein the check sales status module is located on the server and communicates with the on-line transaction system;
  (h) a software purchasing program located on the server for allowing the on-line transaction system to immediately and automatically execute a purchase transaction for the customer based on the check sales status module identifying the customer pre-registration choice is available, wherein a formula is generated in order to execute the purchase at some time variable, just prior to a projected public sale posting to ensure that the transaction take place the moment that the event or merchandise is offered; and (i) a software program located on the source system for allowing the source system to communicate with the remote terminal to indicate completed transactions to the customer.

2. The system of claim 1, further comprising a software payment module located on the server for allowing the on-line transaction system and the source system to communicate with a financial institution for the purpose of completing credit card transactions.

3. A method for executing on-line consumer transactions, comprising:
   (a) using a remote terminal to access an on-line transaction system, wherein the customers uses the remote terminal to enter customer information, customer event and merchandise preferences, and customer pre-registration choices of desired events or merchandise, wherein the on-line transaction system further comprises a server and a system database, wherein the system database stores customer information, customer event and merchandise preferences, and customer pre-registration choices, wherein the system database is in communication with at least one vendor source system, and wherein the vendor source system further includes a source database containing current information about any available items and events and upcoming items and events that will be available;
   (b) using a software program located on the server for allowing a consumer to pre-register with the on-line transaction system by entering personal contact information, payment information, customer event and merchandise preferences, and customer pre-registration choices of desired events or merchandise becoming available on-line in the system database, and wherein the software program prioritizes the customer pre-registration choices of desired events or merchandise becoming available on-line in the system database relative to other consumers using the on-line system based on time of the customer pre-registration;
   (c) monitoring the vendor source system for current event and merchandise information using an activity tracking software module located on the server, wherein the activity tracking software communicates available current event and merchandise information to the on-line transaction system;
   (d) using a check sales status module programmed to run at predefined intervals to determine if a customer pre-registration choice is currently available on the source system, wherein the check sales status module is located on the server and communicates available customer pre-registration choices to the on-line transaction system;
   (e) using the software purchasing program located on the server to immediately and automatically execute a purchase transaction for the customer based on the check sales status module identifying the customer pre-registration choice is available in the at least one vendor source system information concerning current availability and on the consumer's desired purchase, wherein a formula is generated in order to execute the purchase at some time variable, just prior to a projected public sale posting to ensure that the transaction take place the moment that the event or merchandise is offered; and
   (f) using software means located within the vendor source system to send notification to the remote terminal indicating that a transaction has been completed.

4. The method of claim 3, further comprising the step of using a software payment module located on the server to allow the on-line transaction system and the source system to communicate with a financial institution for the purpose of completing a credit card transaction.

* * * * *